United States Patent [19]
Sandstrom et al.

[11] Patent Number: 6,046,266
[45] Date of Patent: Apr. 4, 2000

[54] TIRE WITH SILICA REINFORCED TREAD AND/OR SIDEWALL COMPONENTS

[75] Inventors: Paul Harry Sandstrom, Tallmadge; Richard Robinson Smith, Cuyahoga Falls; Kevin James Pyle, Uniontown, all of Ohio

[73] Assignee: The Goodyear Tire & Rubber Company, Akron, Ohio

[21] Appl. No.: 09/159,663

[22] Filed: Sep. 24, 1998

[51] Int. Cl.[7] .................................................. C08K 3/00
[52] U.S. Cl. ........................ 524/492; 524/493; 524/495; 524/496
[58] Field of Search ................................... 524/492, 493, 524/495, 496

[56] References Cited

U.S. PATENT DOCUMENTS 5,916,956  6/1999  Wang ........................................ 524/495

*Primary Examiner*—Edward J. Cain
*Attorney, Agent, or Firm*—Henry C Young, Jr.

[57] ABSTRACT

The present invention relates to the preparation of rubber compositions for tire tread and tire sidewall component applications. A tire is provided having tread of such composition designed for relatively heavy loads such as, for example, truck tires. A tire having a sidewall of such composition is also provided. Such tire component rubber compositions are of rubber compositions reinforced with precipitated silica and selected carbon black in specified amounts and prepared with a prescribed order of addition to the rubber composition and composed of elastomers as a specific combination of natural or synthetic cis 1,4-polyisoprene rubber together with cis 1,4-polybutadiene rubber or with a combination of cis 1,4-polybutadiene rubber and trans 1,4-polybutadiene rubber.

53 Claims, No Drawings

6,046,266

TIRE WITH SILICA REINFORCED TREAD AND/OR SIDEWALL COMPONENTS

FIELD

This invention relates to rubber compositions for tire tread and tire sidewall component applications prepared by a sequential addition of precipitated silica and specified carbon blacks to the rubber composition. In one aspect, the tire tread is designed to be used under relatively heavy loads such as, for example, truck tires. Such tire component rubber compositions are of rubber compositions reinforced with precipitated silica and specified carbon black and composed of specified elastomers.

BACKGROUND

Rubber compositions for tire treads intended for use under heavy loads, such as for example truck tires, may be reinforced with precipitated silica and carbon black and may be composed of various elastomers.

However, for such tires, special considerations usually need to be made for their tire tread rubber compositions.

For example, passenger tire treads are normally used with a desired balance of relatively low rolling resistance for fuel economy, treadwear and relatively high traction for control on the road surface.

However, truck treads are normally designed for use with relatively heavy loads and the traction quality of the rubber composition is usually not as significant since the higher loads placed on the tire itself adds to the traction of the tire tread on the road surface.

Also, significantly, such truck tire treads are usually desirably composed of rubber compositions which are designed to have less internal heat build-up to reduce the running temperature of the tire tread. Such rubber compositions often exhibit less traction between the tread and the road surface, relying more on the load in the tire to enhance the tread's traction characteristic.

Accordingly, for truck tire treads, special attention is normally placed on selection of the rubber reinforcement, including selection of carbon black reinforcement, as well as the selection of elastomers to be used with the specified reinforcement for the reduction in heat build-up quality normally desired.

It is recognized that it is well known to use various materials, and amounts of various individual materials, for tire treads such as, for example, precipitated silica, selected carbon black reinforcement, rubber processing oil, as well as individual elastomers, including natural rubber, cis 1,4-polybutadiene rubber and trans 1,4-polybutadiene rubber.

However, for truck tire treads, designed to effectively carry large loads, it is considered herein that the selection of materials is more material-specific as well as more combination-of-materials specific.

In another aspect of the invention, tires with sidewalls of a specified rubber composition prepared by a prescribed order of addition of carbon black and precipitated silica is also provided.

For tire sidewalls as well as tire treads, it is recognized that cis 1,4-polybutadiene rubber has been suggested for use in their rubber compositions.

However, it is believed to be generally known that the use of relatively high levels of the cis 1,4-polybutadiene rubber in rubber compositions which also contain a relatively high concentration of carbon black reinforcement usually results in an undesirably low tear resistance (tread strength).

Tear resistance of a rubber composition is usually a very important rubber property for both tire treads and tire sidewalls.

Exemplary of suggestions for use of trans 1,4-polybutadiene in various rubber compositions for various tire components, including tire treads, are, for example, U.S. Pat. Nos. 5,174,838 and 5,386,865.

It is appreciated that some forms of trans 1,4-polybutadiene are elastomeric in nature and some forms, usually depending somewhat upon their microstructure, actually exhibit at least one melting point and, thus, are more like a thermoplastic resin in their unvulcanized state and prior to mixing with elastomers. They might sometimes, therefore, be referred to herein in their unvulcanized state as a "trans 1,4-polybutadiene resin".

Upon blending and upon sulfur vulcanizing with various sulfur vulcanizable elastomers, such trans 1,4-polybutadiene resins apparently become elastomeric in nature.

This invention is primarily directed to a discovery, for tire tread and for tire sidewall purposes, of the use of material-specific combinations of known natural rubber or synthetic natural rubber, together with selected butadiene based elastomer(s) in combination with specific particulate reinforcements and processing oil in specified amounts, wherein the precipitated silica and carbon black are required to be provided in a prescribed order of addition. It is believed the described preparation of that such material-specific combinations, which specify defined amounts of such materials, is novel and inventive, particularly for such truck tire treads.

The rubber composition itself, depending largely upon the selection of carbon black, may also be useful as a tire sidewall or other tire components or in rubber tracks, conveyor belts or other industrial product applications.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" if used herein, and according to conventional practice, refers to "parts of a respective material per 100 parts by weight of rubber, or elastomer" which in this invention is intended to include the aforesaid trans 1,4-polybutadiene resin.

A reference to an elastomer's Tg refers to a "glass transition temperature" which can conveniently be determined by a differential scanning calorimeter at a heating rate of 10° C. per minute.

A polymer's melting point, particularly the said trans 1,4-polybutadiene resin-type unvulcanized polymer, can conveniently be determined by use of a differential scanning calorimeter at a heating rate of about 10° C. per minute. Such method of melting point determination is well known to those skilled in such art.

A preparation of a trans 1,4-polybutadiene resin and its characterization may readily be found in U.S. Pat. No. 5,089,574.

SUMMARY AND PRACTICE OF THE INVENTION

In accordance with this invention, a method of preparing a rubber composition is provided which comprises, based upon 100 parts by weight (phr) of diene-based elastomers, (A) blending (1) about 20 to about 60 phr of cis 1,4-polyisoprene elastomer having a Tg in a range of about −65° C. to about −75° C. and (2) about 40 to about 80 phr of (a) trans 1,4-polybutadiene rubber having a Tg in a range of about 70° C. to about −80° C. and cis 1,4-polybutadiene rubber having a Tg in a range of about −100° C. to about −110° C. in a weight ratio of trans 1,4-polybutadiene to cis 1,4-polyisoprene in a range of about 3/1 to about 1/3 or (b) cis 1,4-polybutadiene rubber having a Tg in a range of about −100° C. to about −110° C., (B) about 40 to about 80 phr of carbon black and precipitated silica reinforcing filler comprised of about 20 to about 60 phr of precipitated silica and about 15 to about 60 phr of carbon black and (C) at least one silica coupling agent having a moiety reactive with silanol groups on the surface of the said silica and an additional moiety interactive with the said elastomers and (D) zero to about 10, alternatively about 5 to about 10, phr of rubber processing oil; wherein said carbon black is selected from a first carbon black having a DBP value in a range of about 100 to about 150 cc/100 gm and an Iodine Number in a range of about 90 to about 150 g/kg or a second carbon black having a DBP value in a range of about 65 to about 130 cc/100 gm and an Iodine Number in a range of about 25 to about 85 g/kg;

wherein said method comprises (1) blending said elastomers and carbon black, exclusive of silica and of sulfur curative, in an internal rubber mixer in a first preparatory internal rubber mixing stage for a period of about 1 to about 10 minutes to a temperature in a range of about 150° C. to about 180° C., (2) blending said precipitated silica and silica coupling agent, exclusive of carbon black and of sulfur curative, in at least one internal rubber mixer in an additional, subsequent preparatory internal rubber mixing stage for a period of about one to about 10 minutes to a temperature of about 100° C. to about 180° C.; wherein said oil, if used, may be added either with the carbon black and/or with the silica, and (3) blending sulfur with curative(s) in an internal rubber mixer in a final internal rubber mixing stage for a period of about one to about 4 minutes to a temperature in a range of about 80° C. to about 130° C.; wherein said rubber composition is removed from said internal rubber mixer at the conclusion of each mixing stage and cooled to a temperature below 40° C.

In further accordance with this invention, a rubber composition prepared by such method is provided.

In additional accordance with this invention, such rubber composition is provided as a sulfur vulcanized rubber composition.

In further accordance with this invention, a rubber composition is provided as being prepared by the method of this invention wherein said carbon black is said first carbon black and, further, a tire is provided having a tread of such rubber composition.

In further accordance with this invention, a rubber composition is provided as being prepared by the method of this invention wherein said carbon black is said second carbon black and, further, a tire is provided having at least one component of its sidewall as such rubber composition.

Therefore, in one aspect of the invention a rubber composition is prepared in a sequential series of at least two separate and individual preparatory internal rubber mixing steps, or stages, in which the diene-based elastomer is first mixed with the prescribed carbon black, then adding the silica in a subsequent, separate mixing step and followed by a final mixing step where curatives are blended at a lower temperature and for a substantially shorter period of time.

This sequential mixing, which requires the addition of carbon black and silica in separate mixing step, may sometimes be referred to herein as "cascade mixing".

Thus, such mixing method is distinguished from a simple sequential addition of ingredients in a mixing process which utilizes only one preparatory mixing step followed by a final mixing step for addition of curatives. It is required after each mixing step that the rubber mixture is actually removed from the rubber mixer and cooled to a temperature in a range of about 50° C. to about 20° C. and then added back to an internal rubber mixer for the next sequential mixing step, or stage.

In practice, the preferred weight ratio of silica to carbon black for the rubber compositions is from 1/1 to about 3/1.

It is a significant aspect of the invention that, for the preparation of the rubber composition, the carbon black and elastomers are blended in absence of silica and silica coupler following which, and in a separate, subsequent mixing step, the silica and silica coupler are blended with the elastomer/carbon black mixture.

By utilizing such method, it has been observed that as compared to blending the elastomer, carbon black, silica and silica coupler in the same mixing step, that the selected target properties for the rubber compositions of this patent application are better matched.

Another significant aspect of the invention is the selection of carbon black in combination with the aforesaid sequential mixing method. In particular, for this invention the first carbon black (a) is required for a tire tread composition and second carbon black (b) is required for a tire outer sidewall rubber composition.

In particular, for this invention carbon black (a) is used for a tire tread rubber composition because it promotes a relatively high modulus and good abrasion resistance for the rubber composition.

Thus, the selection of the carbon black is dependent upon the intended use of the rubber composition.

A further significant aspect of this invention is the material-specific utilization of a prescribed combination of known diene-based elastomers, as in particular, cis 1,4-polyisoprene rubber (natural or synthetic, with natural being preferred) in combination with either trans 1,4-polybutadiene and cis 1,4-polybutadiene rubber, or with cis 1,4-polybutadiene rubber, in the tire tread rubber composition in a circumstance where the tire tread rubber is reinforced with precipitated silica with a defined amount of specified carbon black reinforcement and a minimal amount of rubber processing oil, namely a maximum of about 10 phr, and preferably zero phr, of rubber processing oil.

The rubber processing oil restriction is considered herein to be significant because higher levels (amounts) of processing oil are considered herein to have a negative effect on desired abrasion, modulus and tear resistance properties of the rubber composition—which are properties desirable for a tire tread or tire outer sidewall rubber composition.

Use of the cis 1,4-polyisoprene elastomer, particularly natural rubber, having a relatively very low Tg in a range of about −65° C. to about −75° C. is considered herein to be significant and beneficial for the tire tread as a potential phase compatibilizer for the material-specific trans 1,4-polybutadiene and cis 1,4-polybutadiene rubbers having Tg's in a range of about −75° C. to about −110° C., particularly when the two polybutadiene rubbers are used in combination with each other.

The presence of the trans 1,4-polybutadiene rubber in the tread rubber composition is important because it allows the use of higher levels (amounts) of polybutadiene rubbers for improved wear (DIN abrasion values) without loss of tear resistance.

It is to be appreciated that the use of the individually prescribed elastomers is not novel for a tire tread rubber composition nor a tire outer sidewall rubber composition. The novelty resides in the combination of the material-specific elastomers together with material-specific low levels of specified carbon black and low to non-existence levels of rubber processing oil combined with the specialized method of preparation of the rubber compositions.

The use of relatively low levels of the specified carbon black in the prescribed tread rubber composition is important because it promotes relatively high rebound values for enhancing (reducing) tire rolling resistance and tire durability by promoting a reduced heat build-up and, thus, a cooling running temperature, for a tire tread rubber composition.

The selection of a specific, and relatively minimal range of carbon black(s) itself is important because the higher structured (finer particle size) carbon black (a), characterized by having the relatively high DBP value in a range of about 110 to about 160 and an accompanying Iodine number value in a range of 90 to 150, promotes a higher DIN abrasion resistance value for the rubber composition, whereas the lower structured (larger particle size) carbon black (b), characterized by a significantly lower DBP value in a range of about 70 to about 140 and an accompanying Iodine number value of from about 30 to about 90 are considered herein to be better suited for other tire components, particularly an outer sidewall rubber composition as well as industrial products such as belts and hoses.

Representative of such material-specific carbon black (a) for tire treads are, for example N121, N110, and N234. It is to be appreciated that use of such carbon blacks for tire tread rubber compositions itself is not novel. The novelty resides in use of such carbon blacks with the material-specific combination of elastomers as well as the relatively limited use of rubber processing oil in combination of the restrictive method of preparation.

The DBP and Iodine value characterizations for the carbon blacks and the methods for their determination may be readily found in *The Vanderbilt Handbook, Thirteenth Edition* (1990), pages 416–419.

For a better understanding of the prescribed selection of the defined carbon blacks, reference is made to the accompanying drawing.

In the drawing, a graphical representation is presented in which carbon blacks are shown and differentiated in terms of their DBP value and Iodine number.

More specifically, the aforesaid carbon black (a) is represented by Box A as having a DBP value in a range of about 110 to about 160 cc/100 gm and an Iodine Number in a range of about 90 to about 150. Representative of such carbon blacks are N347, N299, N220 and N110.

More specifically, the aforesaid carbon black (b) is represented by Box B as having a DBP value in a range of about 60 to about 130 cc/100 gm and an Iodine Number in a range of about 25 to about 85. Representative of such carbon blacks are N762, N660, N550, N351, N330 and N326.

Therefore, it may be more clearly seen in the drawing that carbon black (a) and carbon black (b) are mutually exclusive.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur vulcanized material (rubbers), the additives mentioned above are selected and commonly used in conventional amounts.

In practice, the said trans 1,4-polybutadiene resin preferably has a microstructure characterized by having a trans 1,4- content of about 80 to about 90 percent, a vinyl 1,2- content of about 10 to about 15 percent and a cis 1,4- content of about 1 to about 5 percent.

Preferably, the said trans 1,4-polybutadiene resin is further characterized by having a molecular weight number average (Mn) in a range of about 150,000 to about 210,000.

Such trans 1,4-polybutadiene resin preferably has a heterogeneity index (HI) in a range of about 2 to about 2.5 which is representative of a relatively narrow heterogeneity index (a ratio of its molecular weight number average (Mn) to its molecular weight average (Mw). A narrow heterogeneity index is often desirable for various purposes.

Preferably the said trans 1,4-polybutadiene resin has a melting point in a range of about 38° C. to about 42° C.

Typically, the said trans 1,4-polybutadiene has a Tg within a range of about −70° C. to about −80° C.

While all aspects of the invention may not be fully understood, it is believed that the aforesaid microstructure of the trans 1,4-polybutadiene resin contributes substantially to its thermoplastic resin type of properties, particularly its rather hard and stiff appearance property at temperatures below about 30° C., such as about 20° C. to about 25° C., and its melting point property within a temperature range of about 30° C. to about 50° C.

It is also considered that its characterized molecular weight average (Mn) range as well as its relatively narrow heterogeneity index may contribute somewhat to its aforesaid resin-like property prior to mixing it with other elastomers.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. −180° C.) and elevated pressure in a suitable mold. Such practice is well known to those having skill in such art.

Thus, in a more specific aspect of this invention, depending somewhat upon the aforesaid carbon black selection, a tire is provided having a tread component, namely an outer, circumferential tread intended to be ground-contacting, comprised of a rubber composition prepared according to this invention.

In a further aspect of this invention, tires with components other than treads as well as components of industrial products are contemplated.

Representative of such minor amount of additional diene-based elastomers, namely up to a maximum of 5 phr if used at all, are, for example, vinyl polybutadiene rubbers particularly medium to high vinyl polybutadiene rubbers containing about 30 to about 85 percent vinyl 1,2- content, styrene/butadiene copolymers whether prepared by aqueous emulsion or organic solvent polymerization, isoprene/butadiene copolymers, styrene/isoprene copolymers and styrene/isoprene/butadiene terpolymers.

Precipitated silicas are, for example, those obtained by the acidification of a soluble silicate, e.g., sodium silicate. Such precipitated silicas are well known to those having skill in such art.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica is conventionally used in conjunction with a silica coupler to connect the silica with the elastomer(s) and, thus, enhance the elastomer reinforcing effect of the silica.

Such coupling agents may, for example, be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in-situ with the silica.

In particular, such coupling agents are sometimes composed of a silane which has a constituent component, or moiety, (the silane portion) capable of reacting with the silica surface, namely, silanol groups on the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

Numerous coupling agents are taught for use in combining silica and rubber such as, for example, silane coupling agents containing a polysulfide component, or structure, such as, for example, a bis(3-alkoxysilylalkyl) polysulfide where the alkyl radicals for the alkoxy group are selected from methyl and ethyl radicals, the alkyl radical for the silane portion are selected from ethyl, propyl and butyl radicals and the polysulfidic bridge contains an average or (a) from 2 to 6, and an average of from 2.1 to 2.8, sulfur atoms or (b) from 2 to 8, and an average of from 3.5 to 4.5 sulfur atoms. A representative example of such coupling agent is bis-(3-triethoxysilylpropyl) polysulfide having (a) from 2 to 6, and an average of from 2.1 to 2.8, sulfur atoms in its polysulfidic bridge or (b) from 2 to 8, and an average of from 3.5 to 4.5 sulfur atoms in its polysulfidic bridge.

It is readily understood by those having skill in the art that the rubber composition would be compounded by methods generally known in the rubber compounding art, such as mixing the various sulfur-vulcanizable constituent rubbers with various commonly used additive materials such as, for example, curing aids such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

An amount of processing aids for a practice of this invention may be about zero to about 10 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives, with an exception of the rubber processing oil, are not considered to be an aspect of the present invention which is more primarily directed to the preparation of tire treads of a rubber composition which is quantitatively reinforced with silica, with only a minimum of carbon black, and which contains a cis 1,4-polyisoprene rubber with cis 1,4-polybutadiene rubber or a combination of trans 1,4-polybutadiene and cis 1,4-polybutadiene rubber, particularly where the prescribed mixing process is used.

The mixing of the rubber composition can preferably be accomplished by the aforesaid cascade mixing process. For example, the ingredients may be mixed in at least three stages, namely, at least two non-productive (preparatory) stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

In one aspect of the invention, it is desired to provide a sulfur vulcanized (cured) diene-based rubber compositions which can have the following combination of threshold physical properties for use in tire treads which may sometimes be referred to herein as "Target Properties". Such properties are represented in the following Table A:

TABLE A

| Target Properties | Values |
| --- | --- |
| Modulus, 300%, MPa | at least 7.5, and in a range of 7.5 to 14 |
| Rebound at 100° C. a range | at least 52, and in a range of 52 to 70% |
| Hardness, Shore A (100° C.) | at least 54, and in a range of 54 to 72 |
| Abrasion, DIN (cc) | maximum of 62, and in a range of 25 to 62 |
| E' at 0° C. (MPa) | at least 24, and in a range of 24 to 50 |
| Tear Resistance, 95° C. (N) | at least 150, and in a range of 150 to 350 |

These Target Properties are considered significant because they relate to desired physical properties, particularly for predicting suitable tire tread performance.

In particular, a modulus of greater than 7.5 MPa (a range of 7.5 to 14 MPa) is important because it is considered herein to relate to better (less) abrasion and better handling characteristics.

A Rebound value at 100° C. of at least 52 percent (a range of 52 to 70 percent) is important because it is considered herein to relate to better (reduced) tire heat build-up and rolling resistance characteristics.

A Shore A hardness value at 100° C. of at least 54 (a range of 54 to 72) is important because it is considered herein to relate to better tire handling and greater abrasion resistance (less wear) characteristics.

A DIN abrasion resistance of a maximum of 62 cc (a range of 25 to 62 cubic centimeters) is important because it is considered herein to relate to a better (reduced) treadwear characteristic.

An E' value at 0° C. of greater than 24 MPa (a range of 24 to 50 MPa) is important because it is considered herein to relate to an improved (less) irregular treadwear characteristic. The E' value, as it is well known to those having skill in relevant art, relates to low strain rubber composition stiffness.

The tear resistance (peel adhesion test) value of at least 150 (a range of 150 to 350) is important because it is considered herein to relate to better (reduced) tire tread chip chunking and fatigue wear characteristics.

In practice, while it is considered herein that the above-referenced rubber composition target properties are individually significant for relating to specifically desired tire characteristics, it is a desirable feature of this invention that all of the above target properties are obtained for a rubber composition by the practice of this invention.

The invention may be better understood by reference to the following examples in which the parts and percentages are by weight unless otherwise indicated.

EXAMPLE I

In this Example, the rubber compositions shown in Table 1 were prepared in an internal rubber mixer (a Banbury mixer) using either (1) a two-stage mixing process (identified herein as the Sample A) or (2) a cascade three-stage mixing process in which carbon black reinforcement is mixed with the elastomer(s) in a first mixing stage followed by mixing therewith, in a separate, second mixing stage, silica and silica coupler (identified herein as Sample B).

In particular, the two-stage mixing process utilized two separate, sequential stages of addition of materials, namely, a non-productive mix stage (at higher temperature and without curatives), followed by a final productive mix stage (at a lower temperature and with the addition of curatives). Such sequential rubber mixing process is well known to those having skill in such art.

The non-productive (without curatives) rubber composition (Sample A) was mixed for about three minutes to a temperature of 160° C. In a subsequent and final, productive mixing stage, curatives were added and the rubber composition was mixed about two minutes to a temperature of 120° C.

Sample B utilized a cascade mixing procedure which involved three separate, sequential mixing stages of addition of materials (in an internal rubber mixer), namely, two sequential non-productive stages followed by a productive mix. In particular, for the first non-productive stage, natural rubber and cis 1,4-polybutadiene were mixed with the carbon black and other compounding materials for about three minutes to a temperature of about 160° C. In the second, sequential, non-productive mixing stage, silica and coupling agent are added to the composition obtained from the first non-productive stage while mixing for about three minutes to a temperature of 160° C. The composition from the second non-productive stage was then mixed in a final productive stage with curatives for a period of about two minutes to a temperature of about 120° C.

Table 1 illustrates the ingredients used for preparing the rubber compositions of Samples A and B.

TABLE 1

| Sample | A | B |
| --- | --- | --- |
| 1st Non-Productive | | |
| Natural Rubber[1] | 50 | 50 |
| Cis 1,4-polybutadiene[2] | 50 | 50 |
| Silica[3] | 30 | 0 |
| Coupling Agent[4] | 6 | 0 |
| Carbon Black[5] | 30 | 30 |
| Aromatic Processing Oil | 10 | 10 |
| Wax[6] | 1.5 | 1.5 |
| Zinc Oxide | 3 | 3 |
| Fatty Acid[7] | 3 | 3 |
| 2nd Non-Productive Mixing | | |
| Silica[8] | 0 | 30 |
| Coupling Agent[4] | 0 | 6 |
| Productive | | |
| Sulfenamide Accelerator | 1.3 | 1.3 |
| Sulfur | 1 | 1 |
| Antidegradents[9] | 3.5 | 3.5 |

[1]Natural rubber (cis 1,4-polyisoprene rubber) - as TTR20 - Technical Thai Rubber.
[2]High cis 1,4-polybutadiene rubber (BUDENE ® 1208) from The Goodyear Tire & Rubber Company.
[3]Zeosil 1165 MP from Rhone-Poulenc.
[4]X50S from Degussa GmbH, as a 50/50 mixture of bis-(3-triethoxysilylpropyl) tetrasulfide and carbon black and, thus, is 50% active as a coupling agent.
[5]N121, SAF carbon black.
[6]Microcrystalline/paraffinic mixture.
[7]Primarily stearic acid.
[8]Obtained as Zeosil 1165 MP from Rhone-Poulenc.
[9]Amine type antioxidant/antiozonants.

The rubber compositions of Table 1 were cured for about 36 minutes at about 150° C. Various resulting physical properties are shown in the following Table 2.

TABLE 2

| Sample | A | B |
|---|---|---|
| Mix Procedure | Standard | Cascade |
| Rheometer, 150° C. | | |
| Max. Torque, dNm | 14.1 | 18.1 |
| Min. Torque, dNm | 4.0 | 4.0 |
| Delta Torque, dNm | 10.1 | 14.1 |
| $T_{90}$, minutes | 21 | 21.5 |
| Stress-Strain | | |
| Tensile Strength, MPa | 18.3 | 18.9 |
| Elongation @ Break, % | 641 | 654 |
| 100% Modulus | 1.5 | 1.8 |
| 300% Modulus | 6.7 | 7.5 |
| Rebound | | |
| 100° C., % | 54 | 53 |
| Hardness | | |
| Shore A, 100° C. | 50 | 54 |
| Rheovibron | | |
| E' @ 60° C. | 8.7 | 13.5 |
| E' @ 0° C. | 16.0 | 24.4 |
| Tan. Delta @ 60° C. | .150 | .137 |
| Tan. Delta @ 0° C. | .153 | .138 |
| Abrasion | | |
| DIN | 36 | 35 |
| Tear Resistance (N) | | |
| Peel Adhesion, 95° C. | 389 | 312 |

Before evaluating the cured properties of the compositions shown in Table 2, it is important to reiterate the desired Target Properties (Table A), namely, a 300% modulus of at least 7.5 MPa (7.5–14 range), Rebound at 100° C. of at least 52% (52–70% range), Shore A hardness of at least 54 (54–72 range), DIN abrasion value below 62 cm³ (62–25 range), a viscoelastic modulus value, E' of at least 24 (24–50 range) at 0° C. and a peel adhesion tear resistance at 95° C. of at least 150 Newtons (150–350 range).

The Sample A composition prepared by the two-stage mixing process did not meet those targets because of low values for 300% Modulus (6.7 MPa), hardness (50) and viscoelastic modulus E'@0° C. (16 MPa).

The relative physical properties of the Sample B, however, prepared by the prescribed three-stage cascade mixing process, where carbon black is mixed in a separate mixing stage prior to addition of silica and coupler, meet all the referenced Target Properties and represents a preferred mixing process for the preparation of the compounds for this invention.

The superior vulcanizate properties of Sample B compared to Sample A were not expected, without experimentation, since both rubber compositions contained the same ingredients in the same proportions.

EXAMPLE II

In this Example, rubber compositions similar to those described in Example I were prepared using a cascade mixing procedure as described for the preparation of Sample B in Example I. This mixing procedure utilized three separate, sequential stages of addition of materials, namely, two sequential non-productive stages followed by a productive stage. In this example, the order of addition of fillers was examined, namely, carbon black in the first non-productive stage followed by silica in the second non-productive stage (Samples C and D) or silica in the first non-productive stage followed by carbon black in the second non-productive stage (Sample E).

The rubber composition was mixed in the non-productive mixing stages for about three minutes each to a temperature of about 160° C., unless it was "heat treated" such as for Samples D and E where the mixing time of the non-productive stage in which silica was added was extended for about 7 minutes while a temperature of about 160° C. was maintained.

This use of a constant mixing temperature was achieved by varying the rotor speed of the internal mixer and is referred to herein as a "heat treatment". In this manner, for Sample D, heat treatment was applied to the second non-productive stage, whereas for Sample E, heat treatment was applied to the first non-productive stage. Productive stages were mixed as described in Example I.

Table 3 describes the rubber composition for the Example.

TABLE 3

| Sample | C | D | E |
|---|---|---|---|
| 1st Non-Productive | | | |
| Natural Rubber[1] | 50 | 50 | 50 |
| Cis 1,4-Polybutadiene[2] | 50 | 50 | 50 |
| Silica[3] | 0 | 0 | 30 |
| Coupling Agent[4] | 0 | 0 | 6 |
| Carbon Black[5] | 30 | 30 | 0 |
| Aromatic Processing Oil | 10 | 10 | 10 |
| Wax[6] | 1.5 | 1.5 | 1.5 |
| Zinc Oxide | 3 | 3 | 3 |
| Fatty Acid[7] | 3 | 3 | 3 |
| 2nd Non-Productive | | | |
| Silica | 30 | 30 | 0 |
| Coupling Agent[4] | 6 | 6 | 0 |
| Carbon Black | 0 | 0 | 30 |
| Productive | | | |
| Sulfenamide Accelerator | 1.3 | 1.3 | 1.3 |
| Sulfur | 1 | 1 | 1 |
| Antidegradents[9] | 3.5 | 3.5 | 3.5 |

[1]Natural rubber (cis 1,4-polyisoprene rubber) - as TTR20 - Technical Thai Rubber.
[2]High cis 1,4-polybutadiene rubber (BUDENE ® 1208) from The Goodyear Tire and Rubber Company.
[3]Zeosil 1165 MP from Rhone-Poulenc.
[4]X50S from Degussa GmbH, as a 50/50 mixture of bis-(3-triethoxysilylpropyl) tetrasulfide and carbon black and, thus, is 50% active as a coupling agent.
[5]N121 SAF carbon black.
[6]Microcrystalline/paraffinic mixture.
[7]Primarily stearic acid.
[8]Obtained as Zeosil 1165 MP from Rhone-Poulenc.
[9]Amine type antioxidant/antiozonants.

The rubber compositions of Table 3 were cured for about 36 minutes at about 150° C. Various resulting physical properties are shown in the following Table 4.

TABLE 4

| Sample | C | D | E |
|---|---|---|---|
| Carbon Black Addition Stage | 1 | 1 | 2 |
| Silica Addition Stage | 2 | 2 | 1 |
| Heat Treatment Stage | None | 2 | 1 |
| Rheometer, 150° C. | | | |
| Max. Torque, dNm | 15.6 | 14.3 | 14.7 |
| Min. Torque, dNm | 3.5 | 2.8 | 3.2 |
| Delta Torque, dNm | 12.1 | 11.5 | 11.5 |
| $T_{90}$, minutes | 19 | 17 | 17.5 |

TABLE 4-continued

| Sample | C | D | E |
|---|---|---|---|
| Stress-Strain | | | |
| Tensile Strength, MPa | 19.2 | 19.9 | 18.7 |
| Elongation @ Break, % | 621 | 586 | 597 |
| 100% Modulus | 1.9 | 1.8 | 1.9 |
| 300% Modulus | 8.3 | 9.0 | 8.6 |
| Rebound | | | |
| 100° C., % | 59 | 63 | 58 |
| Hardness | | | |
| Shore A, 100° C. | 55 | 54 | 54 |
| Abrasion | | | |
| DIN | 37 | 33 | 31 |
| Tear Resistance (N) | | | |
| Peel Adhesion, 95° C. | 235 | 171 | 210 |

All three samples in Table 4 exhibit properties in the range of Table A target values. Sample C (no heat treatment) and Sample D (heat treated in the second non-productive stage) both were prepared by the same sequence of filler addition, namely, carbon black addition in the first non-productive stage and silica addition in the second non-productive stage. Heat treatment of Sample D provided a somewhat higher rebound value compared to Sample C (63% vs. 59%) and somewhat improved abrasion resistance value (less wear) (33 vs. 37), but had poorer tear resistance (less resistance to tear) (171 vs. 235). Heat treatment of these cascade mixed samples is, thus, not observed to be critical to obtaining the target properties of this invention.

Also, the properties of Sample D (carbon black addition in first stage, silica addition in second stage) and Sample E (silica addition in first stage, carbon black addition in second stage) are quite similar. Both of these samples were heat treated. Sample D had somewhat higher rebound value than Sample E (63 vs. 58), but worse tear resistance (171 vs. 210).

However, the mixing sequence utilized for Sample C and D is preferred over that utilized for Sample E since the addition of carbon black in the first stage followed by silica in the second stage provides superior processing behavior of the non-productive and productive compounds compared to the reverse order of filler addition. Samples C and D were less fragmented when dumped (removed) from the internal mixer and had better subsequent milling behavior (sheeting out from a two-roll mill).

EXAMPLE III

In this Example, a rubber composition containing carbon black and silica fillers was prepared with natural rubber, cis 1,4-polybutadiene and trans 1,4-polybutadiene.

The rubber composition contained the materials shown in Table 5 and was prepared using the three-stage cascade mixing process described in Example I.

This composition was not heat treated. The composition is referred to herein as Sample F and is illustrated in the following Table 5.

TABLE 5

| Sample | F |
|---|---|
| 1st Non-Productive | |
| Natural Rubber[1] | 20 |
| Cis 1,4-Polybutadiene[2] | 50 |
| Trans 1,4-Polybutadiene[3] | 30 |
| Carbon Black[6] | 30 |
| Aromatic Processing Oil | 10 |
| Wax[7] | 1.5 |
| Zinc Oxide | 3 |
| Fatty Acid[8] | 3 |
| 2nd Non-Productive | |
| Silica[4] | 30 |
| Coupling Agent[5] | 6 |
| Productive | |
| Sulfenamide Accelerator | 1.3 |
| Sulfur | 1.0 |
| Antidegradents[9] | 3.5 |

[1]TTR20 - Technical Thai Rubber.
[2]High cis 1,4-polybutadiene rubber (BUDENE ® 1208) from The Goodyear Tire & Rubber Company.
[3]High trans 1,4-polybutadiene rubber (experimental polymer: 80% trans).
[4]Zeosil 1165 MP from Rhone-Poulenc.
[5]X50S from Degussa GmbH, as a 50/50 mixture of bis-(3-triethoxysilylpropyl) tetrasulfide and carbon black and, thus, is 50% active as a coupling agent.
[6]N121 SAF carbon black.
[7]Microcrystalline/paraffinic mixture.
[8]Primarily stearic acid.
[9]Amine type antioxidant/antiozonants.

Sample F is similar to Sample B in Table 1, but 30 phr of the NR (natural rubber) is replaced with 30 phr of trans 1,4-polybutadiene (trans-BR) to provide an elastomer composition of 20/50/30 natural rubber/cis 1,4-polybutadiene/trans 1,4-polybutadiene.

The rubber composition of Table 5 was cured for about 36 minutes to about 150° C. Physical properties are shown in the following Table 6.

TABLE 6

| Sample | F |
|---|---|
| Natural Rubber | 20 |
| Cis-BR | 50 |
| Trans-BR | 30 |
| Stress-Strain | |
| Tensile Strength, MPa | 16.7 |
| Elongation @ Break, % | 583 |
| 100% Modulus | 2.1 |
| 300% Modulus | 7.7 |
| Rebound | |
| 100° C., % | 56 |
| Hardness | |
| Shore A, 100° C. | 60 |
| Rheovibron | |
| E' @ 60° C. | 17.9 |
| E' @ 0° C. | 48.5 |
| Tan. Delta @ 60° C. | .118 |
| Tan. Delta @ 0° C. | .113 |
| Abrasion | |
| DIN | 29 |
| Tear Resistance | |
| Peel Adhesion, 95° C. | 168 |

Sample F containing 30 phr trans-BR along with 20 phr NR and 50 phr cis-BR exhibited a much higher viscoelastic modulus, E' at 0° C. than Sample B (50 phr NR/50 phr cis-BR) of Table 1 (48.5 vs. 24.4 MPa), as well as higher hardness (60 vs. 54) and rebound (56 vs. 53). All of the physical properties of Sample F meet the target properties.

Therefore, it may be concluded that addition of trans-BR to the rubber compositions of this invention provides the required target properties with the benefit of very high viscoelastic modulus value and high hardness.

EXAMPLE IV

In this Example, rubber compositions were prepared which contained 50 phr of natural rubber and 50 phr cis 1,4-polybutadiene with carbon black and/or precipitated silica reinforcement.

The rubber compositions contained the materials shown in Table 7 and were prepared in an internal rubber mixer as in Example I for the three-stage cascade mix procedure.

The rubber compositions are referred to herein as Samples G–K. In particular, Sample G contained 60 phr of a SAF carbon black, Sample K contained 60 phr silica and Samples H, I and J contained blends of carbon black and silica.

TABLE 7

| Sample | G | H | I | J | K |
|---|---|---|---|---|---|
| 1st Non-Productive | | | | | |
| Natural Rubber[1] | 50 | 50 | 50 | 50 | 50 |
| Cis 1,4-Polybutadiene[2] | 50 | 50 | 50 | 50 | 50 |
| Silica[3] | 0 | 0 | 0 | 15 | 30 |
| Coupling Agent[4] | 0 | 2 | 4 | 2 | 4 |
| Carbon Black[5] | 30 | 30 | 30 | 15 | 0 |
| Nicotinamide | 2 | 2 | 2 | 2 | 2 |
| Aromatic Processing Oil | 5 | 5 | 5 | 5 | 5 |
| Wax[6] | 1.5 | 1.5 | 1.5 | 1.5 | 1.5 |
| Zinc Oxide | 3 | 3 | 3 | 3 | 3 |
| Fatty Acid | 3 | 3 | 3 | 3 | 3 |
| 2nd Non-Productive | | | | | |
| Silica[7] | 0 | 15 | 30 | 30 | 30 |
| Carbon Black | 30 | 15 | 0 | 0 | 0 |
| Coupling Agent[4] | 0 | 2 | 4 | 4 | 4 |
| Productive | | | | | |
| Sulfenamide Accelerator | 1 | 1 | 1 | 1 | 1 |
| Sulfur | 1 | 1 | 1 | 1 | 1 |
| Antidegradents[8] | 3.5 | 3.5 | 3.5 | 3.5 | 3.5 |

[1]TTR20 - Technical Thai Rubber.
[2]High cis 1,4-polybutadiene rubber (BUDENE ® 1208) from The Goodyear Tire & Rubber Company.
[3]Zeosil 1165 MP from Rhone-Poulenc.
[4]X50S from Degussa GmbH, as a 50/50 mixture of bis-(3-triethoxysilylpropyl) tetrasulfide and carbon black and, thus, is 50% active as a coupling agent.
[5]N121 SAF carbon black.
[6]Microcrystalline/paraffinic mixture.
[7]Obtained as Zeosil 1165 MP from Rhone-Poulenc.
[8]Amine type antioxidant/antiozonants.

The rubber composition of Table 7 were vulcanized (cured) for about 36 minutes to a temperature of about 150° C. Physical properties are shown in the following Table 8.

TABLE 8

| Sample | G | H | I | J | K |
|---|---|---|---|---|---|
| Carbon Black | 60 | 45 | 30 | 15 | 0 |
| Silica | 0 | 15 | 30 | 45 | 60 |
| Coupling Agent (50% active) | 0 | 2 | 4 | 6 | 8 |
| Rheometer, 150° C. | | | | | |
| Max. Torque, dNm | 50.7 | 49.3 | 45 | 46.9 | 53 |
| Min. Torque, dNm | 18.0 | 16.7 | 13.4 | 15.8 | 21 |
| Delta Torque, dNm | 32.7 | 32.6 | 31.6 | 31.1 | 32 |
| $T_{90}$, minutes. | 10.5 | 11.5 | 16 | 20 | 26.5 |
| Stress-Strain | | | | | |
| Tensile Strength, MPa | 18.7 | 18.3 | 18.2 | 17.5 | 17.1 |
| Elongation @ Break, % | 500 | 482 | 529 | 570 | 664 |
| 100% Modulus | 2.6 | 2.7 | 2.5 | 2.2 | 2.0 |
| 300% Modulus | 11.3 | 11.5 | 10.3 | 9.0 | 7.3 |
| Rebound | | | | | |
| 100° C., % | 51.8 | 55.9 | 57.3 | 58.1 | 56.4 |
| Hardness | | | | | |
| Shore A, 100° C. | 62 | 62 | 61 | 59 | 63 |
| Rheovibron | | | | | |
| E' @ 60° C., MPa | 30.1 | 22.2 | 20.0 | 18.0 | 21.5 |
| E' @ 0° C., MPa | 44.7 | 37.9 | 30.0 | 26.4 | 33.0 |
| Tan. Delta @ 60° C. | .107 | .119 | .109 | .105 | .105 |
| Tan. Delta @ 0° C. | .094 | .113 | .106 | .111 | .107 |
| Abrasion | | | | | |
| DIN | 50 | 53 | 56 | 53 | 65 |
| Tear Resistance (N) | | | | | |
| Peel Adhesion, 95° C. | 122 | 127 | 154 | 165 | 224 |

The properties of Samples G and H did not meet the target values of Table A because of low values for tear resistance, namely, 122 and 127 Newtons, respectively. Sample G also had a rebound value of 51.8 which is below the target value. Sample K also did not meet these targets because of a low 300% modulus value, 7.3 MPa, and a higher DIN abrasion value, 65.

The properties of Samples I and J met all of the Target values and indicate optimum properties in a 50/50 blend of natural rubber and cis 1,4-polybutadiene when the total of carbon black and silica was about 60 phr and the ratio of silica to carbon black is 1/1 to 3/1.

EXAMPLE V

In this Example, rubber blend compositions were prepared which contained 40 to 60 phr natural rubber and correspondingly 60 to 40 phr cis 1,4-polybutadiene rubber together with 30 phr carbon black and 30 phr silica. Two types of carbon blacks (SAF and HAF) and two types of silica were used for evaluation.

The rubber compositions are shown in Table 9 and were prepared using the cascade mixing procedures of Example I.

The rubber compositions are identified herein as Samples L–P.

TABLE 9

| Sample | L | M | N | O | P |
|---|---|---|---|---|---|
| 1st Non-Productive | | | | | |
| Natural Rubber[1] | 40 | 50 | 60 | 50 | 50 |
| Cis 1,4-Polybutadiene[2] | 60 | 50 | 40 | 50 | 50 |

TABLE 9-continued

| Sample | L | M | N | O | P |
|---|---|---|---|---|---|
| CB A[3] | 30 | 30 | 30 | 0 | 30 |
| CB B[4] | 0 | 0 | 0 | 30 | 0 |
| Aromatic Processing Oil | 5 | 5 | 5 | 5 | 5 |
| Nicotinamide | 2 | 2 | 2 | 2 | 2 |
| Wax | 1.5 | 1.5 | 1.5 | 1.5 | 1.5 |
| Zinc Oxide | 3 | 3 | 3 | 3 | 3 |
| Fatty Acid | 3 | 3 | 3 | 3 | 3 |
| 2nd Non-Productive | | | | | |
| Silica A[5] | 30 | 30 | 30 | 30 | 0 |
| Silica B[6] | 0 | 0 | 0 | 0 | 30 |
| Coupling Agent | 5 | 5 | 5 | 5 | 5 |
| Productive | | | | | |
| Sulfenamide Accelerator | 0.8 | 0.8 | 0.8 | 0.8 | 0.8 |
| Sulfur | 0.8 | 0.8 | 0.8 | 0.8 | 0.8 |
| Antidegradants | 3.5 | 3.5 | 3.5 | 3.5 | 3.5 |
| Hexamethylene-tetramine | 2 | 2 | 2 | 2 | 2 |

[1]TTR20 - Technical Thai Rubber.
[2]BUDENE ® 1208 from The Goodyear Tire & Rubber Company.
[3]N121 SAF carbon black.
[4]N347 HAF carbon black.
[5]Zeosil 1165 MP from Rhone-Poulenc.
[6]Hi-Sil 210 from PPG.

Various physical properties of the sulfur cured rubber compositions are shown in the following Table 10.

TABLE 10

| Sample | L | M | N | O | P |
|---|---|---|---|---|---|
| NR/cis-BR | 40/60 | 50/50 | 60/40 | 50/50 | 50/50 |
| CB-A/CB-B | 30/0 | 30/0 | 30/0 | 0/30 | 30/0 |
| Silica A/Silica B | 30/0 | 30/0 | 30/0 | 30/0 | 0/30 |
| Rheometer, 150° C. | | | | | |
| Max. Torque, dNm | 43.5 | 39.8 | 41 | 40.5 | 44 |
| Min. Torque, dNm | 13.6 | 12.0 | 12.5 | 12 | 13 |
| Delta Torque, dNm | 29.9 | 27.8 | 28.5 | 28.5 | 31 |
| $T_{90}$, minutes. | 17.0 | 17 | 16.5 | 15 | 19.5 |
| Stress-Strain | | | | | |
| Tensile Strength, MPa | 16.5 | 18.1 | 18.8 | 17.5 | 18.0 |
| Elongation @ Break, % | 544 | 558 | 551 | 540 | 564 |
| 100% Modulus | 2.3 | 2.2 | 2.4 | 2.4 | 2.4 |
| 300% Modulus | 9.0 | 9.3 | 10.2 | 9.8 | 9.4 |
| Rebound | | | | | |
| 100° C., % | 53 | 55 | 55 | 56 | 52 |
| Hardness | | | | | |
| Shore A, 100° C. | 61 | 58 | 59 | 59 | 61 |
| Rheovibron | | | | | |
| E' @ 60° C., MPa | 20.8 | 19.2 | 21.0 | 17.8 | 19.9 |
| E' @ 0° C., MPa | 33.2 | 29.6 | 30.7 | 30.2 | 30.7 |
| Tan. Delta @ 60° C. | .124 | .122 | .111 | .118 | .109 |
| Tan. Delta @ 0° C. | .112 | .115 | .108 | .120 | .106 |
| Abrasion | | | | | |
| DIN | 47 | 62 | 69 | 58 | 61 |
| Tear Resistance (N) | | | | | |
| Peel Adhesion, 95° C. | 171 | 178 | 161 | 156 | 205 |

All of the rubber compositions, with the exception of Sample N in Table 10, exhibit the required target properties. Sample N has a DIN abrasion value above the Target Property value and would be expected to have a treadwear rating (greater wear) below that of the other samples. This would indicate that the upper limit for the natural rubber content is below about 60 phr.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a rubber composition which comprises, based upon 100 parts by weight (phr) of diene-based elastomers, (A) blending (1) about 20 to about 60 phr of cis 1,4-polyisoprene elastomer having a Tg in a range of about −65° C. to about −75° C. and (2) about 40 to about 80 phr of (a) trans 1,4-polybutadiene rubber having a Tg in a range of about −70° C. to about −80° C. and cis 1,4-polybutadiene rubber having a Tg in a range of about −100° C. to about −110° C. in a weight ratio of trans 1,4-polybutadiene to cis 1,4-polyisoprene in a range of about 3/1 to about 1/3 or (b) cis 1,4-polybutadiene rubber having a Tg in a range of about −100° C. to about −110° C., (B) about 40 to about 80 phr of carbon black and precipitated silica reinforcing filler comprised of about 20 to about 60 phr of precipitated silica and about 15 to about 60 phr of carbon black and (C) at least one silica coupling agent having a moiety reactive with silanol groups on the surface of the said silica and an additional moiety interactive with the said elastomers and (D) zero to about 10 phr of rubber processing oil; wherein said carbon black is selected from a first carbon black having a DBP value in a range of about 100 to about 150 cc/100 gm and an Iodine Number in a range of about 90 to about 150 g/kg or a second carbon black having a DBP value in a range of about 65 to about 130 cc/100 gm and an Iodine Number in a range of about 25 to about 85 g/kg;

wherein said method comprises (1) blending said elastomers and carbon black, exclusive of silica and of sulfur curative, in an internal rubber mixer in a first preparatory internal rubber mixing stage for a period of about one to about 10 minutes to a temperature in a range of about 150° C. to about 180° C., (2) blending said precipitated silica and silica coupling agent, exclusive of carbon black and of sulfur curative, in at least one internal rubber mixer in an additional, subsequent preparatory internal rubber mixing stage for a period of about one to about 10 minutes to a temperature of about 150° C. to about 180° C.; wherein said oil, if used, may be added either with the carbon black and/or with the silica, and (3) blending sulfur curative(s) with in an internal rubber mixer in a final internal rubber mixing stage for a period of about one to about 4 minutes to a temperature in a range of about 80° C. to about 130° C.; wherein said rubber composition is removed said internal rubber mixer at the conclusion of each mixing stage and cooled to a temperature below 40° C.

2. The method of claim 1 wherein said coupling agent is a bis(3-trialkoxysilylalkyl) polysulfide wherein the alkyl radicals of the alkoxy groups are selected from methyl and ethyl radicals, the alkyl radical of the silane portion is selected from ethyl, propyl and butyl radicals; and wherein the polysulfide bridge contains (a) from 2 to 6, and an average of from 2.1 to 2.8, sulfur atoms or (b) from 2 to 8, and an average of from 3.5 to 4.5, sulfur atoms.

3. The method of claim 1 wherein said diene-based elastomers are cis 1,4-polyisoprene, said trans 1,4-polybutadiene and said cis 1,4-polybutadiene.

4. The method of claim 1 wherein said diene-based elastomers are cis 1,4-polyisoprene and cis 1,4-polybutadiene.

5. The method of claim 2 wherein said diene-based elastomers are cis 1,4-polyisoprene, said trans 1,4-polybutadiene and said cis 1,4-polybutadiene.

6. The method of claim 2 wherein said diene-based elastomers are cis 1,4-polyisoprene and cis 1,4-polybutadiene.

7. The method of claim 1 wherein said carbon black is said first carbon black.

8. The method of claim 2 wherein said carbon black is said first carbon black.

9. The method of claim 3 wherein said carbon black is said first carbon black.

10. The method of claim 4 wherein said carbon black is said first carbon black.

11. The method of claim 5 wherein said carbon black is said first carbon black.

12. The method of claim 6 wherein said carbon black is said first carbon black.

13. The method of claim 1 wherein said carbon black is said second carbon black.

14. The method of claim 2 wherein said carbon black is said second carbon black.

15. The method of claim 3 wherein said carbon black is said second carbon black.

16. The method of claim 4 wherein said carbon black is said second carbon black.

17. The method of claim 5 wherein said carbon black is said second carbon black.

18. The method of claim 6 wherein said carbon black is said second carbon black.

19. The method of claim 1 wherein the rubber processing oil is used in an amount of from 5 to 10 phr.

20. The method of claim 2 wherein the rubber processing oil is used in an amount of from 5 to 10 phr.

21. A rubber composition prepared by the method of claim 1.

22. A rubber composition prepared by the method of claim 1 which is sulfur vulcanized.

23. A rubber composition prepared by the method of claim 2 which is sulfur vulcanized.

24. A rubber composition prepared by the method of claim 3 which is sulfur vulcanized.

25. A rubber composition prepared by the method of claim 4 which is sulfur vulcanized.

26. A rubber composition prepared by the method of claim 5 which is sulfur vulcanized.

27. A rubber composition prepared by the method of claim 6 which is sulfur vulcanized.

28. A rubber composition prepared by the method of claim 7 which is sulfur vulcanized.

29. A rubber composition prepared by the method of claim 8 which is sulfur vulcanized.

30. A rubber composition prepared by the method of claim 9 which is sulfur vulcanized.

31. A rubber composition prepared by the method of claim 10 which is sulfur vulcanized.

32. A rubber composition prepared by the method of claim 11.

33. A rubber composition prepared by the method of claim 12 which is sulfur vulcanized.

34. A rubber composition prepared by the method of claim 13 which is sulfur vulcanized.

35. A rubber composition prepared by the method of claim 14 which is sulfur vulcanized.

36. A rubber composition prepared by the method of claim 15 which is sulfur vulcanized.

37. A rubber composition prepared by the method of claim 16 which is sulfur vulcanized.

38. A rubber composition prepared by the method of claim 17 which is sulfur vulcanized.

39. A rubber composition prepared by the method of claim 18 which is sulfur vulcanized.

40. A rubber composition prepared by the method of claim 19 which is sulfur vulcanized.

41. A rubber composition prepared by the method of claim 20 which is sulfur vulcanized.

42. A tire having a tread of the rubber composition of claim 28.

43. A tire having a tread of the rubber composition of claim 29.

44. A tire having a tread of the rubber composition of claim 30.

45. A tire having a tread of the rubber composition of claim 31.

46. A tire having a tread of the rubber composition of claim 32.

47. A tire having a tread of the rubber composition of claim 33.

48. A tire having at least a portion of a sidewall as the rubber composition of claim 34.

49. A tire having at least a portion of a sidewall as the rubber composition of claim 35.

50. A tire having at least a portion of a sidewall as the rubber composition of claim 36.

51. A tire having at least a portion of a sidewall as the rubber composition of claim 37.

52. A tire having at least a portion of a sidewall as the rubber composition of claim 38.

53. A tire having at least a portion of a sidewall as the rubber composition of claim 39.

* * * * *